United States Patent
Sun et al.

(10) Patent No.: US 10,370,963 B2
(45) Date of Patent: Aug. 6, 2019

(54) METHOD FOR SELECTING BED BOUNDARIES AND LOG SQUARING USING ELECTROMAGNETIC MEASUREMENTS

(71) Applicant: Schlumberger Technology Corporation, Sugar Land, TX (US)

(72) Inventors: Keli Sun, Sugar Land, TX (US); Dzevat Omeragic, Lexington, MA (US); Steve F. Crary, Al-Khobar (SA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 394 days.

(21) Appl. No.: 15/026,230

(22) PCT Filed: Sep. 30, 2014

(86) PCT No.: PCT/US2014/058307
§ 371 (c)(1),
(2) Date: Mar. 30, 2016

(87) PCT Pub. No.: WO2015/048742
PCT Pub. Date: Apr. 2, 2015

(65) Prior Publication Data
US 2016/0245080 A1  Aug. 25, 2016

Related U.S. Application Data

(60) Provisional application No. 61/884,457, filed on Sep. 30, 2013.

(51) Int. Cl.
*G01V 3/18* (2006.01)
*G01V 3/26* (2006.01)
(Continued)

(52) U.S. Cl.
CPC ........ *E21B 49/00* (2013.01); *E21B 47/02216* (2013.01); *G01V 3/18* (2013.01);
(Continued)

(58) Field of Classification Search
USPC .......................................................... 702/7
See application file for complete search history.

(56) References Cited

U.S. PATENT DOCUMENTS 5,446,654 A   8/1995  Chemali et al.
6,163,155 A  12/2000  Bittar
(Continued)

FOREIGN PATENT DOCUMENTS

WO   2015048742 A1   4/2015

OTHER PUBLICATIONS

Bootle et al., Laminated Sand-Shale Formation Evaluation Using Azimuthal LWD Resistivity, presented at ATCE, SPE Annual Technology Conference, New Orleans, LA, Oct. 4-7, 2009.
(Continued)

*Primary Examiner* — Gregory J Toatley, Jr.
*Assistant Examiner* — Terence E Stifter, Jr.

(57) ABSTRACT

Techniques for log squaring using both directional and non-directional electromagnetic measurements are disclosed. The techniques described herein can be used for determining bed boundary locations and assigning resistivity values to each layer in a layered earth model, regardless of well deviation. Potential bed boundary locations can be derived from both directional and non-directional electromagnetic measurement data. The bed boundary locations from the directional and non-directional measurements can then be consolidated using a weighted averaging scheme, where weight can be dependent based on apparent formation dip. By combining the results from both directional and non-directional measurements, the log squaring techniques
(Continued)

described herein can be used in most wells regardless of the well angle (the angle can be arbitrary). Once bed boundaries are selected, formation properties, such as horizontal resistivity (Rh) and vertical resistivity (Rv) can be assigned to the model layers.

22 Claims, 12 Drawing Sheets

(51) Int. Cl.
   *G01V 3/38* (2006.01)
   *E21B 49/00* (2006.01)
   *G01V 99/00* (2009.01)
   *E21B 47/022* (2012.01)

(52) U.S. Cl.
   CPC .............. *G01V 3/26* (2013.01); *G01V 3/38* (2013.01); *G01V 99/005* (2013.01)

(56) References Cited

U.S. PATENT DOCUMENTS

| | | | |
|---|---|---|---|
| 6,353,321 | B1 | 3/2002 | Bittar |
| 6,594,584 | B1 | 7/2003 | Omeragic et al. |
| 6,969,994 | B2 | 11/2005 | Minerbo et al. |
| 6,998,844 | B2 | 2/2006 | Omeragic et al. |
| 7,317,991 | B2 | 1/2008 | Wang et al. |
| 7,536,261 | B2 | 5/2009 | Omeragic et al. |
| 2003/0028324 | A1 | 2/2003 | Xiao et al. |
| 2007/0235225 | A1 | 10/2007 | Bittar |
| 2008/0109167 | A1 | 5/2008 | Wang et al. |
| 2010/0127708 | A1 | 5/2010 | Bittar |
| 2011/0074427 | A1 | 3/2011 | Wang et al. |
| 2011/0231098 | A1* | 9/2011 | Omeragic ............... G01V 3/28 702/7 |
| 2011/0238312 | A1 | 9/2011 | Seydoux et al. |
| 2012/0105076 | A1* | 5/2012 | Li ............................. G01V 3/24 324/601 |
| 2013/0261975 | A1* | 10/2013 | Yang ....................... G01V 3/30 702/10 |
| 2014/0107929 | A1 | 4/2014 | Zhong et al. |
| 2016/0054467 | A1* | 2/2016 | Li ............................. G01V 3/18 702/7 |

OTHER PUBLICATIONS

Li et al., New directional electromagnetic tool for proactive geosteering and accurate formation evaluation while drilling, 46th SPWLA Annual Well Logging Symposium, Paper UU, Jun. 26-29, 2005. New Orleans, LA.

Kreigshauser et al., A New Multicomponent Induction Tool to Resolve Anisotropic Formation, paper D presented at the 41st Annual SPWLA Symposium, Salt Lake City, Utah, May 30-Jun. 3, 2000.

Omeragic et al., Real-Time Interpretation of Formation Structure From Directional EM Measurements, presented at the 47th SPWLA Annual Symposium, Veracruz, Mexico, Jun. 4-7, 2006.

Rosthal et al., Field tests of an experimental fully triaxial induction tool, presented at SPWLA Annual Logging Symposium, Jun. 22-25, 2003, Galveston, TX, paper QQ.

Wang et al., Fast and rigorous inversion of triaxial induction logging data to determine formation resistivity anisotropy, bed boundary position, relative dip and azimuth angles. Presented at SEG Annual Meeting, Oct. 27-30, 2003, Dallas, TX.

International Preliminary Report on Patentability issued in corresponding International application PCT/US2014/058307 dated Apr. 5, 2016. 7 pages.

International Search Report and the Written Opinion for International Application No. PCT/US2014/058307 dated Jan. 9, 2015.

* cited by examiner

METHOD FOR SELECTING BED BOUNDARIES AND LOG SQUARING USING ELECTROMAGNETIC MEASUREMENTS

CROSS-REFERENCE TO RELATED APPLICATIONS

This application claims priority to U.S. Provisional Patent Application Ser. No. 61/884,457, which was filed on Sep. 30, 2013. The entirety of this provisional application is incorporated herein by reference.

BACKGROUND

1. Technical Field

The present disclosure relates generally to downhole electromagnetic logging and, more particularly, to methods for selecting bed boundaries and log squaring tec 2. Background Information This section is intended to introduce the reader to various aspects of art that may be related to various aspects of the subject matter described and/or claimed below. This discussion is believed to be helpful in providing the reader with background information to facilitate a better understanding of the various aspects of the present disclosure. Accordingly, it should be understood that these statements are to be read in this light, not as admissions of prior art.

Logging tools have long been used in wellbores to make, for example, formation evaluation measurements to infer properties of the formations surrounding the borehole and the fluids in the formations. Common logging tools include electromagnetic (resistivity) tools, nuclear tools, acoustic tools, and nuclear magnetic resonance (NMR) tools, though various other types of tools for evaluating formation properties are also available.

Early logging tools were run into a wellbore on a wireline cable after the wellbore had been drilled. Modern versions of such wireline tools are still used extensively. However, as the demand for information while drilling a borehole continued to increase, measurement-while-drilling (MWD) tools and logging-while-drilling (LWD) tools have since been developed. MWD tools typically provide drilling parameter information such as weight on the bit, torque, temperature, pressure, direction, and inclination. LWD tools typically provide formation evaluation measurements such as resistivity, porosity, NMR distributions, and so forth. MWD and LWD tools often have characteristics common to wireline tools (e.g., transmitting and receiving antennas, sensors, etc.), but are designed and constructed to endure and operate in the harsh environment of drilling.

The use of electromagnetic measurements in downhole applications, such as logging while drilling (LWD) and wireline logging applications is well known. Such techniques may be utilized to determine a subterranean formation resistivity, which, along with other formation measurements (such as porosity), can be used to indicate the presence of hydrocarbons in the formation. Moreover, azimuthally sensitive directional resistivity measurements are commonly employed, i.e., in pay-zone geo-steering applications, to provide information upon which steering decisions may be made, for example, including distance and direction to a remote bed. Directional resistivity tools often make use of tilted or transverse antennas (antennas that have a magnetic dipole that is tilted or transverse with respect to the tool axis). Non-directional tools often refer to those that use antennas having magnetic dipoles that are parallel with the tool axis. Further, some electromagnetic logging tools may be capable of making both directional and non-directional measurements.

As can appreciated, once a target area or pay-zone has been identified (e.g., from seismic interpretation, geological mapping, and/or petrophysical analysis) all well trajectory can be planned. Accurate well placement has been a challenge for the industry, and is complicated by a number of factors, such as uncertainty in a target's position and unpredictable structural and/or stratigraphic variations. Particularly, in more recent years, the demand for accurate well placement to produce high angle and/or horizontal wells (sometimes referred to as HAHZ) with complex steering trajectories in subterranean formations has increased, as often these types of wells can at times be more efficient at draining reservoirs and recovering hydrocarbons when compared to the more conventional non-steered wells.

Building layered earth models based formation measurements can be useful in helping drillers make steering decisions. For example, both non-directional and/or directional electromagnetic resistivity measurements have been used to assist with constructing layered models. This process, referred to as "log squaring," uses electromagnetic measurement logs to determine the location of bed boundaries and to assign assumed formation properties to each layer, in this case horizontal resistivity (Rh) and vertical resistivity (Rv). However, depending on the well angle, either non-directional or directional measurements can be more suitable for defining bed boundaries. It would be desirable to have a technique for log squaring that can provide reliable information in all wells regardless of the well's inclination angle.

SUMMARY

A summary of certain embodiments disclosed herein is set forth below. It should be understood that these aspects are presented merely to provide the reader with a brief summary of certain embodiments and that these aspects are not intended to limit the scope of this disclosure. Indeed, this disclosure may encompass a variety of aspects that may not be set forth in this section.

The present disclosure relates to techniques for log squaring using both directional and non-directional electromagnetic measurements. The techniques described herein can be used for determining bed boundary locations and assigning resistivity values to each layer in a layered earth model, regardless of well deviation. In accordance with aspects of such techniques, bed boundary locations can be derived from both directional and non-directional electromagnetic measurement data. The bed boundary locations from the directional and non-directional measurements can then be consolidated using a weighted averaging scheme, where weighting can be dependent based on apparent formation dip. For example, where dip angle indicates a low angle well, the bed boundary locations derived from non-directional measurements may be weighted more heavily, whereas in high angle wells, the bed boundary locations derived from directional measurements may be weighted more heavily. Thus, by combining the results from both directional and non-directional measurements, the log squaring techniques described herein can be used for most wells regardless of the well angle (the angle can be arbitrary). Once bed boundaries are selected, formation properties, such as horizontal resistivity (Rh) and vertical resistivity (Rv) can be assigned to the model layers.

Again, the brief summary presented above is intended to familiarize the reader with certain aspects and contexts of embodiments of the present disclosure without limitation to the claimed subject matter.

BRIEF DESCRIPTION OF DRAWINGS

The present disclosure is best understood from the following detailed description when read with the accompanying figures. It is emphasized that, in accordance with standard practice in the industry, various features are not necessarily drawn to scale. In fact, the dimensions of various features may be arbitrarily increased or rescued for clarify of discussion.

DETAILED DESCRIPTION

Figure 1:
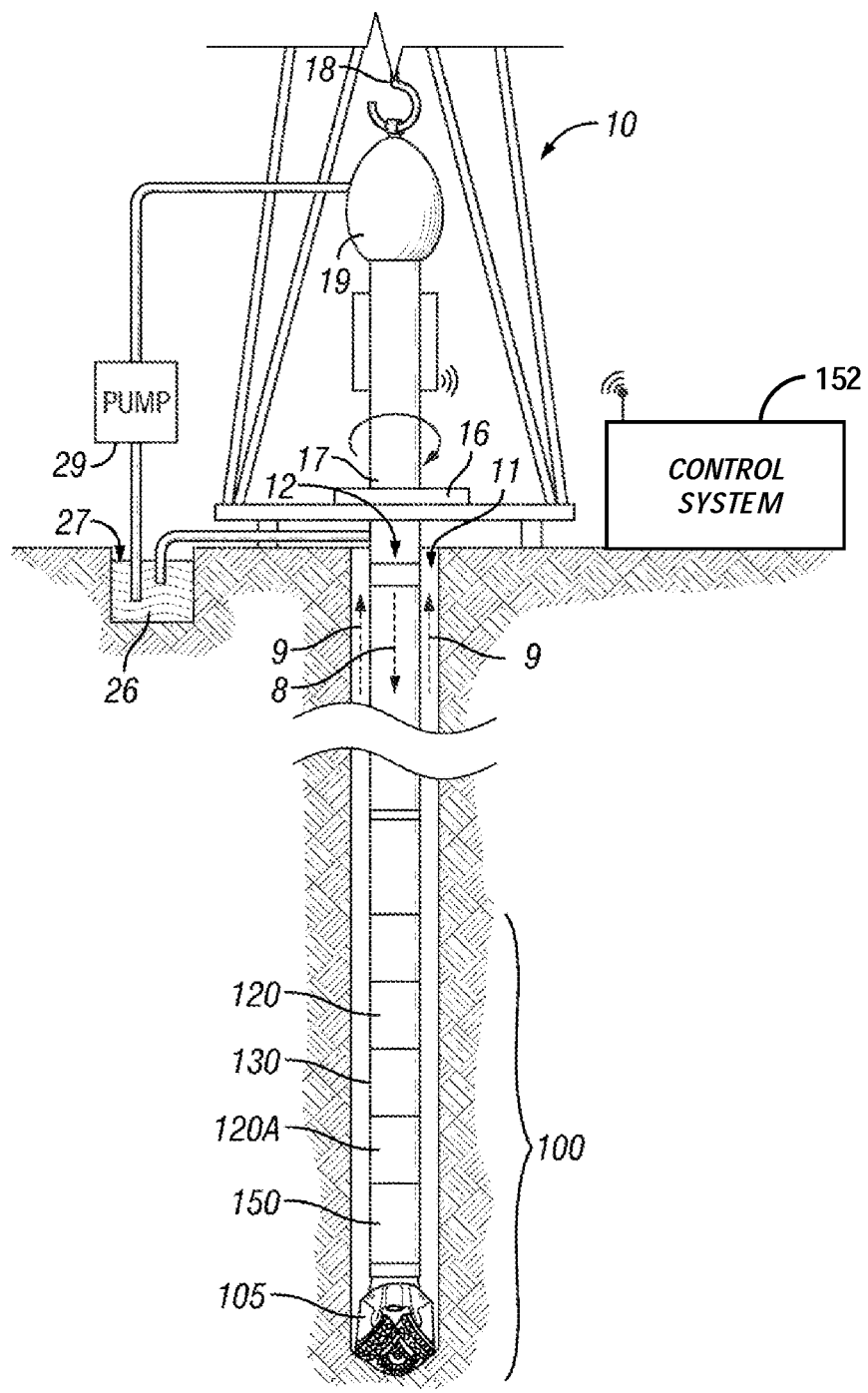
FIG. 1 is a schematic diagram of a wellsite system that may be used for implementation of an example embodiment.

One or more specific embodiments of the present disclosure are described below. These embodiments are merely examples of the presently disclosed techniques. Additionally, in an effort to provide a concise description of these embodiments, all features of an actual implementation may not be described in the specification. It should be appreciated that in the development of any such implementation, as in any engineering or design project, numerous implementation-specific decisions are made to achieve the developers' specific goals, such as compliance with system-related and business-related constraints, which may vary from one implementation to another. Moreover, it should be appreciated that such development efforts might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The embodiments discussed below are intended to be examples that are illustrative in nature and should not be construed to mean that the specific embodiments described herein are necessarily preferential in nature. Additionally, it should be understood that references to "one embodiment" or "an embodiment" within the present disclosure are not to be interpreted as excluding the existence of additional embodiments that also incorporate the recited features.

In certain electromagnetic well logging applications, inversion work flows may be developed to solved for horizontal resistivity (Rh), vertical resistivity (Rv), formation dip and azimuth, as wells as formation bed boundary locations. As is the case with most inversion answer products, the inversion performance can be dependent on the initial guess of the model. An initial model that is close to the true solution can dramatically increase the inversion speed and result accuracy. The processing of constructing an initial layered model (including layer boundaries and properties, i.e., Rh and Rv for electricity properties, in each layer) is referred to as log squaring.

Embodiments of the present disclosure relate to techniques for log squaring using both directional and non-directional electromagnetic measurements. The techniques described herein can be used for determining bed boundary locations and assigning resistivity values to each layer in a layered earth model, regardless of well deviation. In accordance with aspects of such techniques, bed boundary locations can be derived from both directional and non-directional electromagnetic measurement data. The bed boundary locations from the directional and non-directional measurements can then be consolidated using a weighted averaging scheme, where weight can be dependent based on apparent formation dip. For example, where dip angle indicates a low angle well, the bed boundary locations derived from non-directional measurements may be weighted more heavily, whereas in high angle wells, the bed boundary locations derived from directional measurements may be weighted more heavily. Thus, by combining the results from both directional and non-directional measurements, the log squaring techniques described herein can be used for most wells regardless of the well angle (the angle can be arbitrary). Once bed boundaries are selected, formation properties, such as horizontal resistivity (Rh) and vertical resistivity (Rv) can be assigned to the model layers.

With the foregoing in mind, FIG. 1 represents a simplified view of a well site system in which various embodiments can be employed. The well site system depicted in FIG. 1 can be deployed in either onshore or offshore applications. In this type of system, a borehole 11 is formed in subsurface formations by rotary drilling in a manner that is well known to those skilled in the art.

A drill string 12 is suspended within the borehole 11 and has a bottom hole assembly (BHA) 100 which includes a drill bit 105 at its lower end. The surface system includes a platform and derrick assembly 10 positioned over the borehole 11, with the assembly 10 including a rotary table 16, kelly 17, hook 18 and rotary swivel 19. In a drilling operation, the drill string 12 is rotated by the rotary table 16 (energized by means not shown), which engages the kelly 17 at the upper end of the drill string. The drill string 12 is suspended from a hook 18, attached to a traveling block (also not shown), through the kelly 17 and a rotary swivel 19 which permits rotation of the drill string 12 relative to the hook 18. In other embodiment, a top drive system could be used.

Drilling fluid or mud 26 may be stored in a pit 27 formed at the well site. A pump 29 delivers the drilling fluid 26 to the interior of the drill string 12 via a port in the swivel 19, which causes the drilling fluid 26 to flow downwardly through the drill string 12, as indicated by the directional arrow 8 in FIG. 1. The drilling fluid exits the drill string 12 via ports in the drill bit 105, and then circulates upwardly through the annulus region between the outside of the drill string 12 and the wall of the borehole, as indicated by the directional arrows 9. In this known manner, the drilling fluid lubricates the drill bit 105 and carries formation cuttings up to the surface as it is returned to the pit 27 for recirculation.

The drill string 12 includes a BHA 100. In the illustrated embodiment, the BHA 100 is shown as having one MWD module 130 and multiple LWD modules 120 (with reference number 120A depicting a second LWD module 120). As used herein, the term "module" as applied to MWD and LWD devices is understood to mean either a single tool or a suite of multiple tools contained in a single modular device. Additionally, the BHA 100 includes a rotary steerable system (RSS) and motor 150 and a drill bit 105. As will be appreciated, an RSS system and motor 150 can be used to control the direction of the drill bit 105 along a desired well trajectory.

The LWD modules 120 may be housed in a drill collar and can include one or more types of logging tools. The LWD modules 120 may include capabilities for measuring, processing, and storing information, as well as for communicating with the surface equipment. By way of example, the LWD module 120 may include an electromagnetic logging tool capable of directional and non-directional electromagnetic measurements, and may also include capabilities for measuring, processing, and storing information, and for communicating with surface equipment.

The MWD module 130 is also housed in a drill collar, and can contain one or more devices for measuring characteristics of the drill string and drill bit. In the present embodiment, the MWD module 130 can include one or more of the following types of measuring devices: a weight-on-bit measuring device, a torque measuring device, a vibration measuring device, a shock measuring device, a stick/slip measuring device, a direction measuring device, and an inclination measuring device (the latter two sometimes being referred to collectively as a D&I package). The MWD tool 130 further includes an apparatus (not shown) for generating electrical power for the downhole system. For instance, power generated by the MWD tool 130 may be used to power the MWD tool 130 and the LWD tool(s) 120. In some embodiments, this apparatus may include a mud turbine generator powered by the flow of the drilling fluid 26. It is understood, however, that other power and/or battery systems may be employed.

The operation of the assembly 10 of FIG. 1 may be controlled using control system 152 located at the surface. The control system 152 may include one or more processor-based computing systems. In the present context, a processor may include a microprocessor, programmable logic devices (PLDs), field-gate programmable arrays (FPGAs), application-specific integrated circuits (ASICs), system-on-a-chip processors (SoCs), or any other suitable integrated circuit capable of executing encoded instructions stored, for example, on tangible computer-readable media (e.g., read-only memory, random access memory, a hard drive, optical disk, flash memory, etc.). Such instructions may correspond to, for instance, workflows and the like for carrying out a drilling operation, algorithms and routines for processing data received at the surface from the BHA 100 (e.g., as part of a log squaring process described below and/or for an inversion), and so forth.

Figure 2:
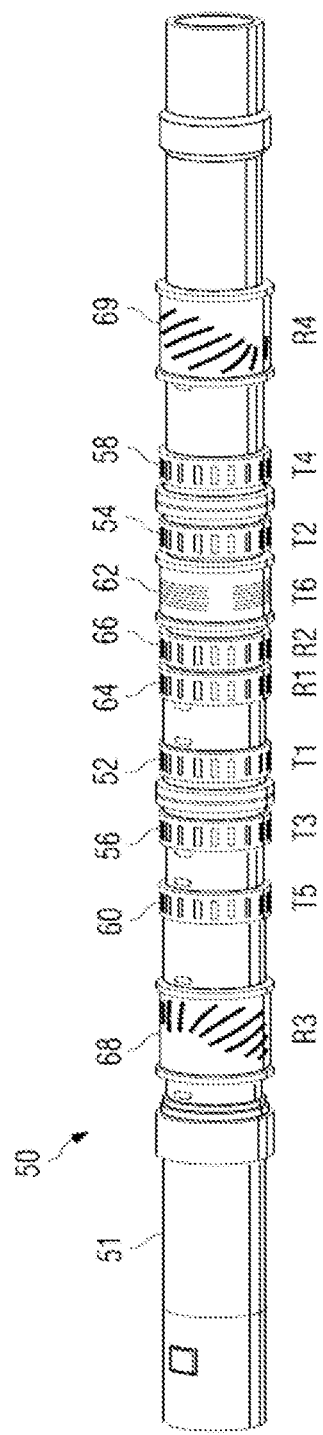
FIG. 2 depicts an example embodiment of an electromagnetic logging tool capable of providing both directional and non-directional resistivity measurements and which can be used in the system shown in FIG. 1.

FIG. 2 depicts one example of an electromagnetic measurement tool 50, which may be part of the LWD module 120 of FIG. 1. The tool 50 may be a multi-spacing directional electromagnetic propagation tool. In one embodiment, the tool 50 may be capable of making measurements at multiple frequencies, such as at 100 kHz, 400 kHz, and 2 MHz. In the depicted embodiment, the measurement tool 50 includes multiple transmitters T1, T2, T3, T4, T5, and T6 depicted at 52, 54, 56, 58, 60, and 62 and multiple receivers R1, R2, R3, and R4 depicted at 64, 66, 68, and 69 spaced axially along tool body 51. In the depicted example, measurement tool 50 includes axial, transverse, and tilted antennas. As used herein, an axial antenna is one whose dipole moment is substantially parallel with the longitudinal axis of the tool, for example, as shown at 54. Axial antennas are commonly wound about the circumference of the logging tool such that the plane of the antenna is orthogonal to the tool axis. Axial antennas produce a radiation pattern that is equivalent to a dipole along the axis of the tool (by convention the z-direction). Electromagnetic measurements made by axially oriented antennas may be referred to as conventional or non-directional measurements.

A transverse antenna is one whose dipole moment is substantially perpendicular to the longitudinal axis of the tool, for example, as shown at 62. A transverse antenna may include a saddle coil (e.g., as disclosed in commonly owned U.S. Patent Publications 2011/0074427 and 2011/0238312) and generate a radiation pattern that is equivalent to a dipole that is perpendicular to the axis of the tool (by convention the x or y direction). A tilted antenna is one whose dipole moment is neither parallel nor perpendicular to the longitudinal axis of the tool, for example, as shown at 68 and 69. Tilted antennas generate a mixed mode radiation pattern (i.e., a radiation pattern in which the dipole moment is neither parallel nor perpendicular with the tool axis). Electromagnetic measurements made by transverse or tilted antennas may be referred to as directional measurements.

In the particular embodiment depicted in FIG. 2, five of the transmitter antennas (T1, T2, T3, T4, and T5) are axial antennas spaced along the axis of the tool. A sixth transmitter antenna (T6) is a transverse antenna. First and second receivers (R1 and R2) located axially between the transmitters are axial antennas and may be used to obtain conventional non-directional type propagation resistivity measurements. Third and fourth receivers (R3 and R4) are tilted antennas located axially about the transmitters. Such a directional arrangement (including tilted and/or transverse antennas) produces a preferential sensitivity on one azimuthal side of the tool 50 that better enables bed boundaries and other features of the subterranean formations to be identified and located.

Accordingly, as the tool 50 provides both axial transmitters and axial receiver pairs as well as axial transmitter and tilted receiver pairs, the tool 50 is capable of making both directional and non-directional electromagnetic measurements. The example logging tool 50 depicted in FIG. 2 may be a model of a tool available under the name PERISCOPE from Schlumberger Technology Corporation of Sugar Land, Tex. It will be understood, however, that the embodiments disclosed herein are not limited to any particular electromagnetic logging tool configuration, and that the tool depicted in FIG. 2 is merely one example of a suitable electromagnetic logging tool.

As described above, embodiments of the present disclosure relate to techniques for log squaring using both directional and non-directional electromagnetic measurements that are applicable regardless of well deviation. In certain embodiments, bed boundaries are derived from both directional and non-directional measurements, and are then weighted based on the apparent formation dip. In this manner, bed boundaries derived from non-directional measurements can be weighted more heavily in low angle or vertical wells while bed boundaries derived from directional measurements can be weighted more heavily in high angle or horizontal wells.

Figure 3:
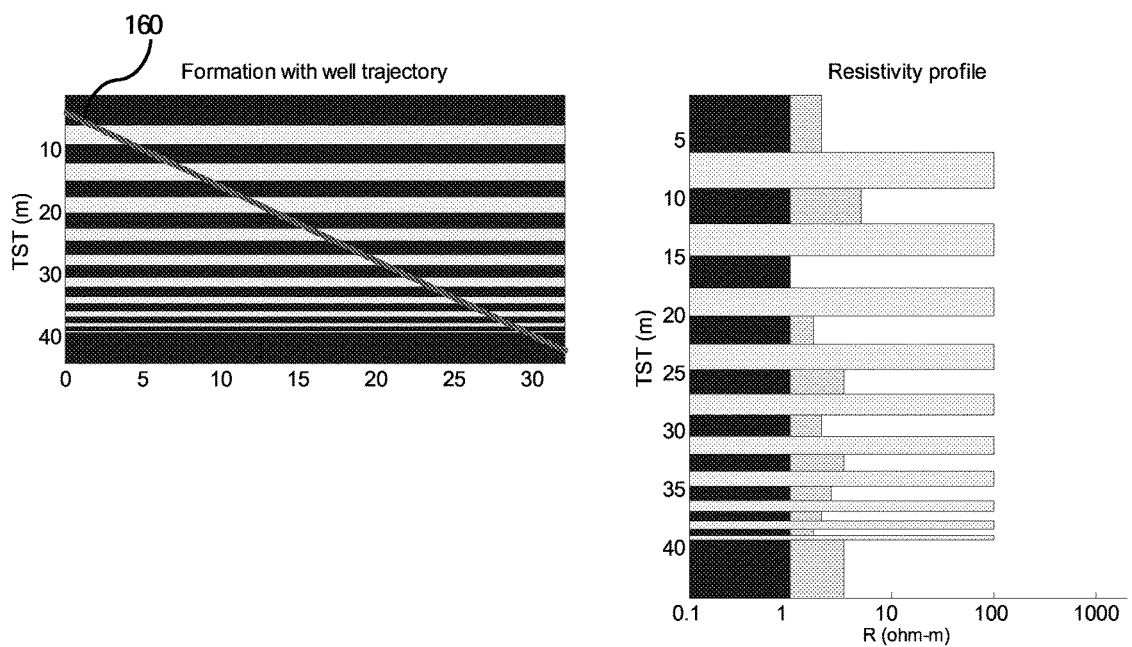
FIG. 3 illustrates an example of a multi-layer formation with a well trajectory having an inclination of 40 degrees.

Referring to FIG. 3, an example formation model is shown. The graph on the left side of FIG. 3 shows a sequence of layers, each having some resistivity/conductivity. The line 160 crossing the layers represents a well trajectory with an inclination of 40° (e.g., meaning a deviation of 40° from vertical). The chart on the right side of FIG. 3 shows the corresponding Rh-Rv resistivity profile the formation model.

Figure 4:
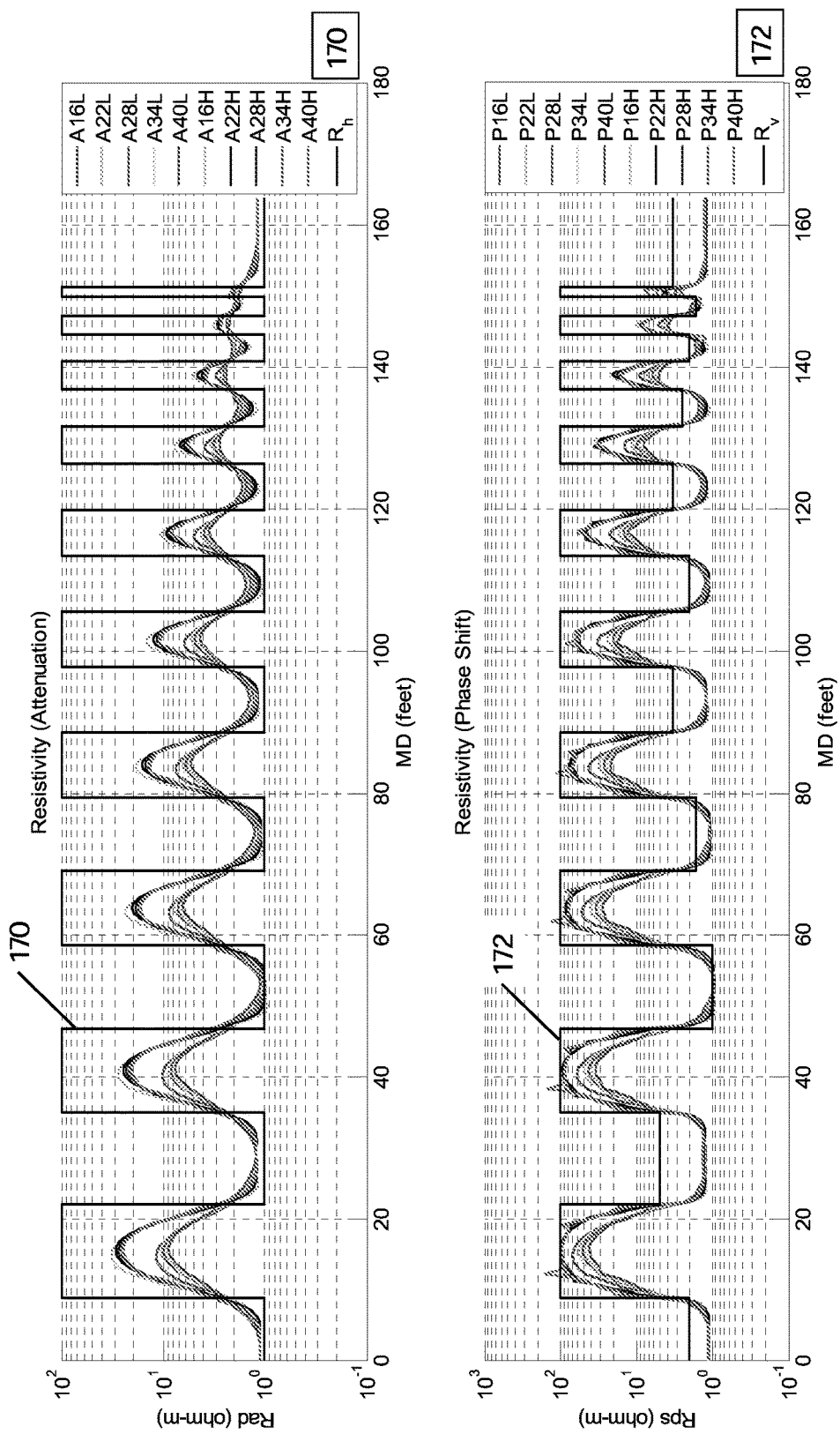
FIG. 4 shows an example of non-directional resistivity responses obtained along the well trajectory in the formation of FIG. 3.

Non-directional resistivity responses (phase shift and attenuation) as obtained by an electromagnetic logging tool from the formation of FIG. 3 (assuming a 40° inclination) are shown in FIG. 4. The various curves correspond to different transmitter-receiver spacings in both up and down directions with respect to the location of the drill bit. It will be understood that a down measurement is one in which the receiver is closer to the drill bit than the transmitter, and an up measurement is one in which the transmitter is closer to the drill bit than the receiver. In the illustrated example, the tool (e.g., tool 50 of FIG. 2) that acquires the displayed measurements provides for the same antenna spacings for up and down measurements, which are sometimes referred to as symmetrized and anti-symmetrized measurements. Additionally, Rh is plotted on the attenuation graph (170 on the top graph in FIG. 4) and Rv is plotted on the phase shift graph (172 on the bottom graph in FIG. 4) to show bed boundary locations. The bed boundary locations usually correspond to points where resistivity responses show the sharpest change. Thus, bed boundary locations may be estimated from the peak of the derivative of the resistivity curve.

Assuming a logging tool similar to that shown in FIG. 2 (tool 50) is used to obtain measurements in the formation of FIG. 3, symmetrized and anti-symmetrized directional measurements can also be obtained using, for instance, two axial transmitters and the two tilted receivers (R3 and R4). For a simple single boundary scenario, these symmetrized directional measurements are sensitive to the conductivity at nearby boundaries. The measurements can be differential, i.e., the difference/ratio of responses for a reference azimuth in the direction of heterogeneity and at the azimuth 180° apart (e.g., the up and down directions). For example, the directional resistivity response may be approximately zero in the middle of a thick bed layer and typically reaches a peak when the tool is at a bed boundary. Accordingly, peaks in directional resistivity measurement curves are generally good indicators for bed boundaries for high angle or horizontal or near horizontal wells.

Figure 5:
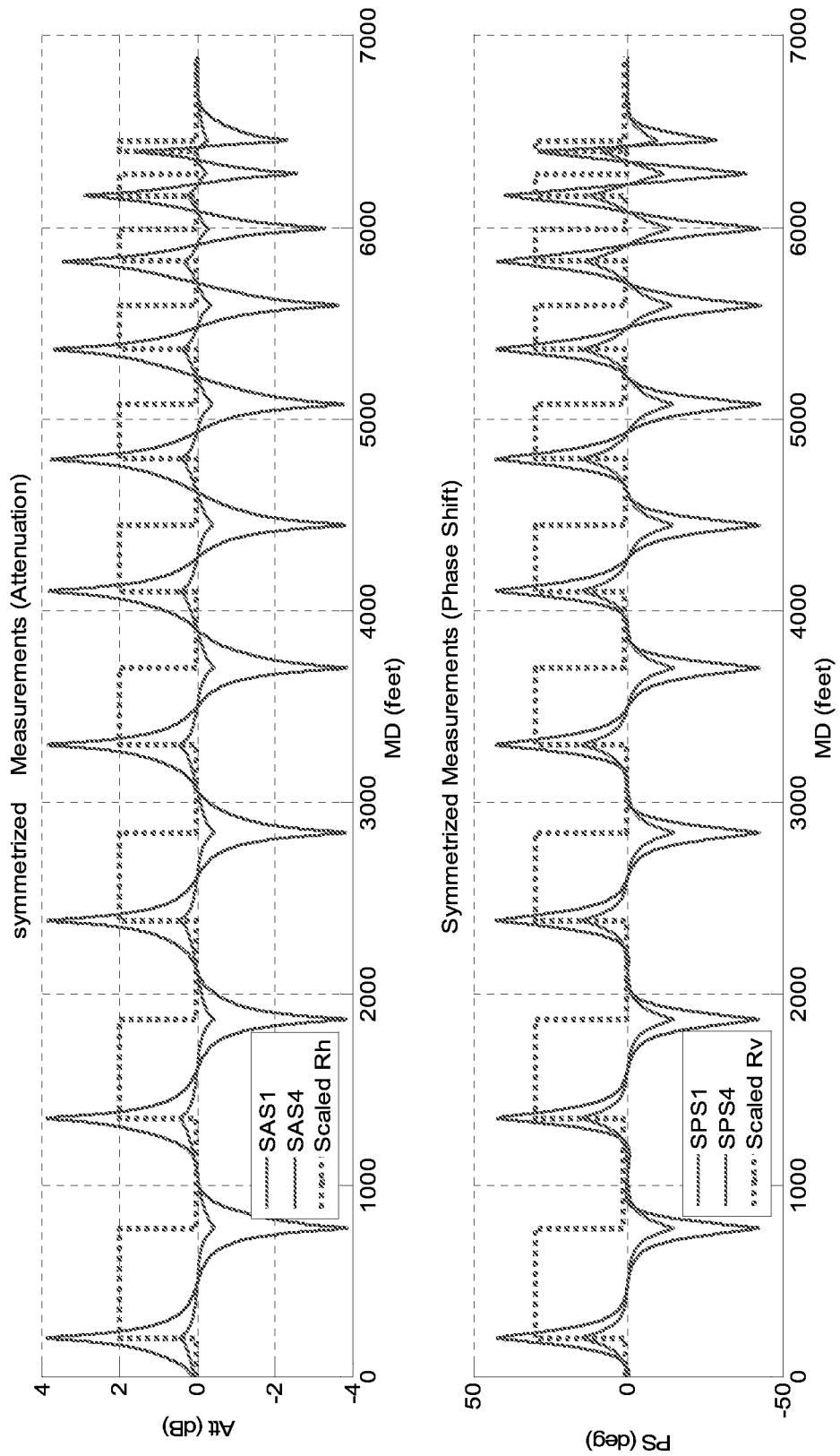
FIG. 5 shows an example of directional resistivity responses obtained along a near horizontal well trajectory.

Referring to FIG. 5, an example of symmetrized directional responses for phase shift and attenuation for a formation model with a near horizontal well inclination (assume 89°) as acquired by the logging tool 50 is shown. Normalized Rh and Rv curves are also plotted (using dashed-lines) to indicate bed boundary locations. As can be seen, in horizontal or near horizontal wells, the peaks of the tool responses tend to align quite well with the bed boundary locations.

Figure 6:
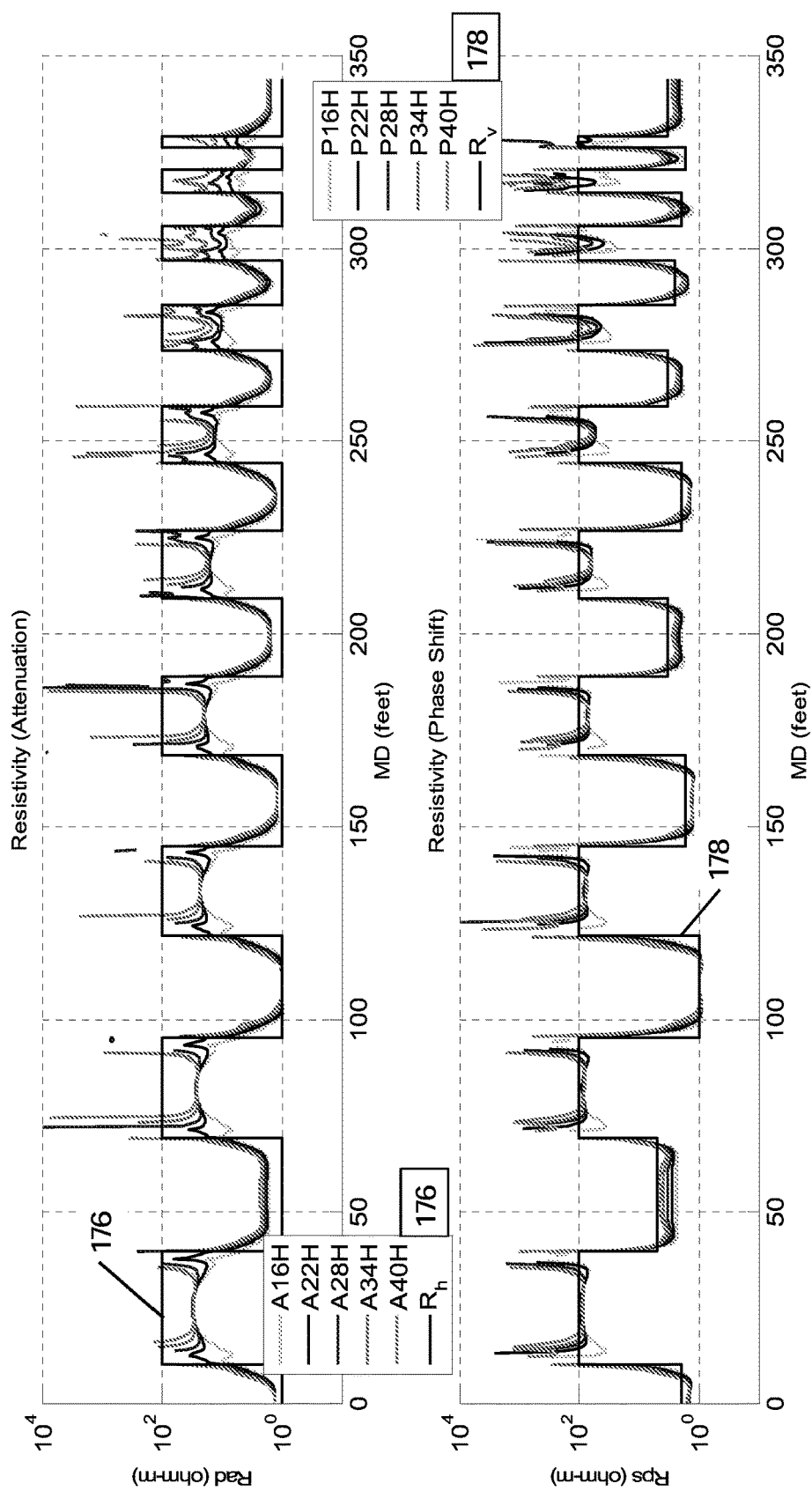
FIG. 6 shows an example of non-directional resistivity responses obtained along a well trajectory having a 70 degree inclination.
Figure 7:
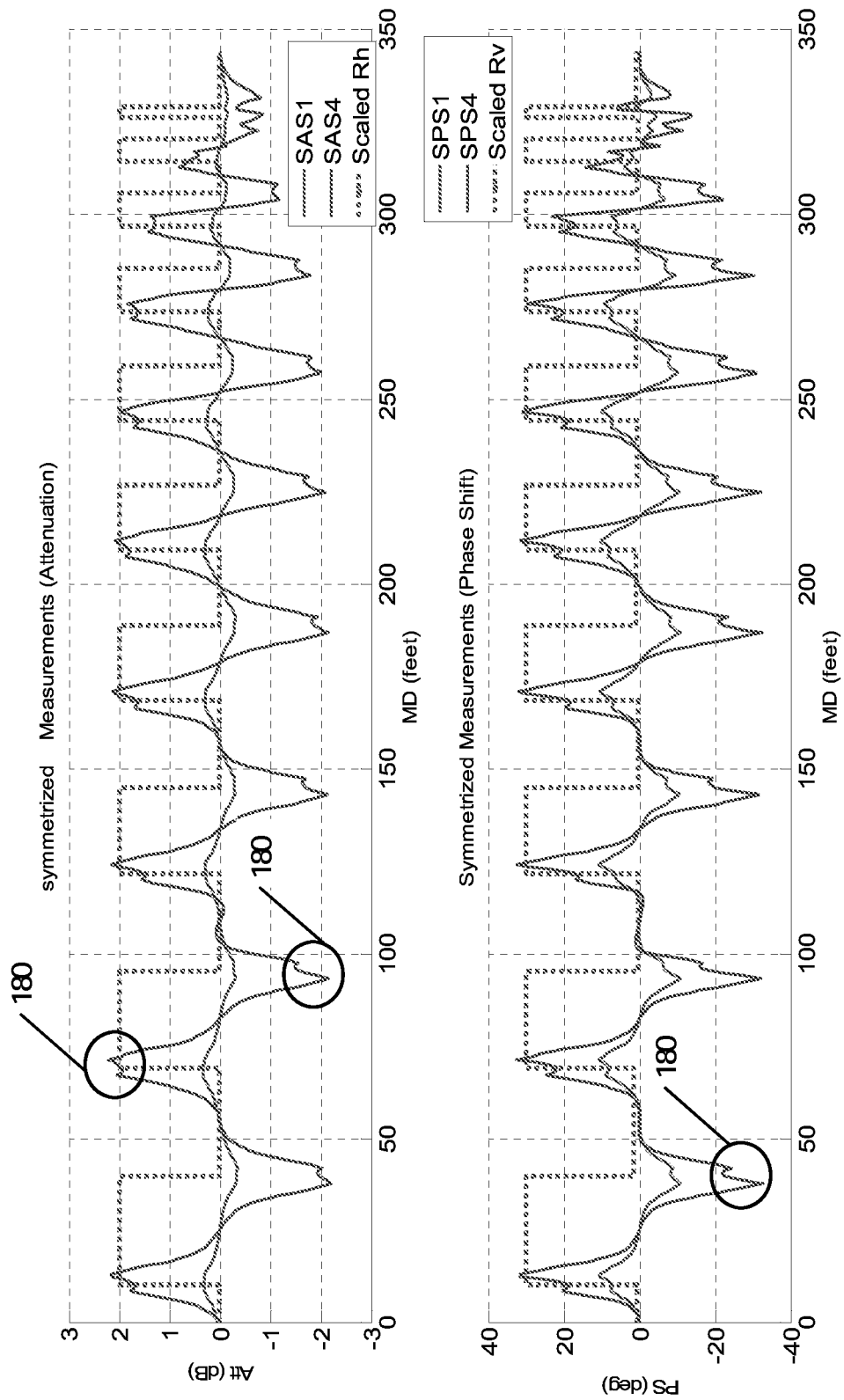
FIG. 7 shows an example of directional resistivity responses obtained along a well trajectory having a 70 degree inclination.

Now consider the case of a well trajectory at an intermediate inclination, such as approximately 70° as an example. In intermediate well inclinations, the resistivity responses measured by the tool 50 may become more complicated. FIGS. 6 and 7 show the non-directional and directional resistivity responses, respectively, for a 70° well inclination. As can be seen in FIG. 6, which shows non-directional resistivity responses for multiple transmitter-receiver spacings as well as Rh (176) and Rv (178), the responses show notable artifacts at the boundary locations, sometimes referred to as a horn effect (or polarization horn effect). This effect is an artifact of propagation resistivity measurements that can often occur when approaching bed boundaries with high resistivity contrast. FIG. 7 shows symmetrized directional resistivity responses for a 70° well inclination. At this intermediate well inclination, it can be seen that multiple peaks appear for each bed boundary location, as shown at 180, as compared to the near horizontal directional measurements shown in FIG. 5.

Figure 8:
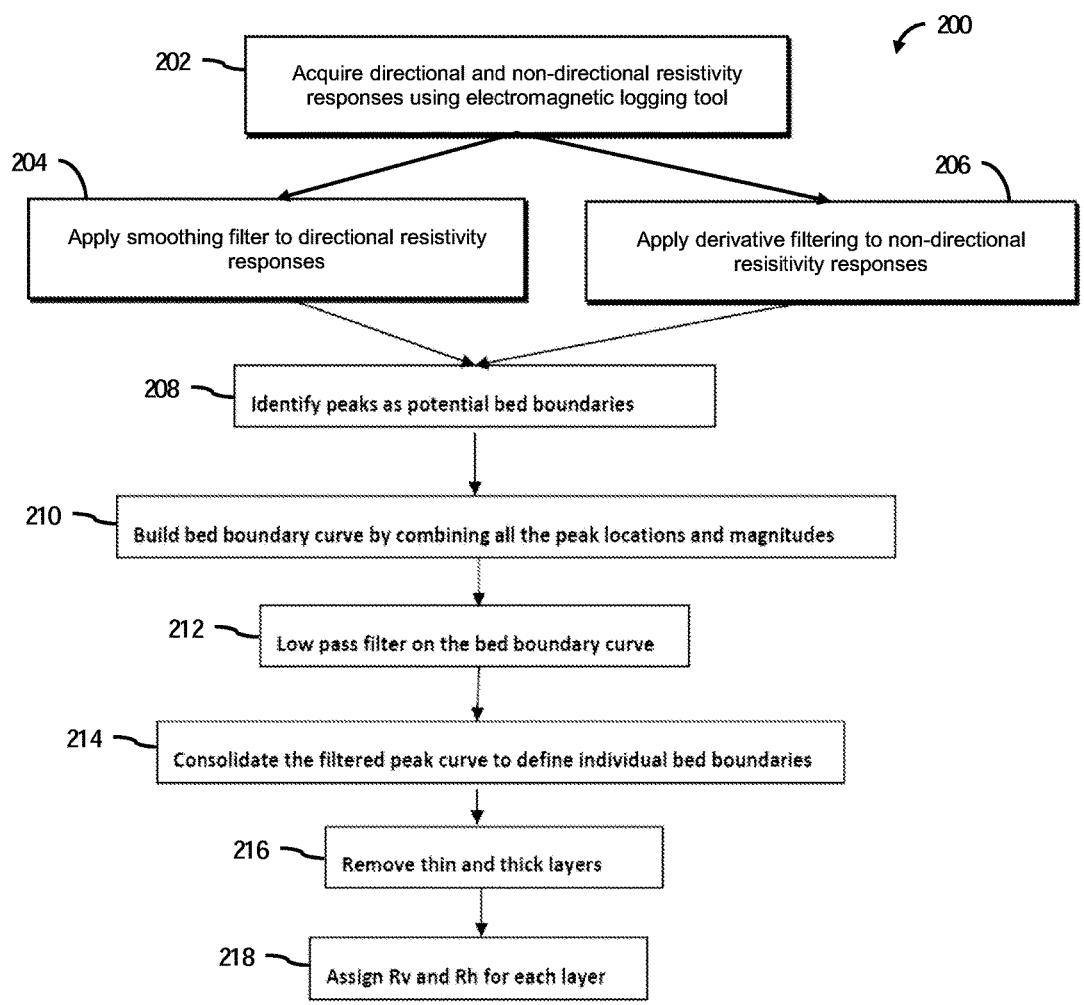
FIG. 8 shows an example embodiment of a method for log squaring using directional and non-directional resistivity measurements.

As discussed above, embodiments of the present disclosure provide techniques for log squaring using both directional and non-directional electromagnetic measurements. The techniques described herein can be used for determining bed boundary locations and assigning resistivity values to each layer in a layered earth model, regardless of well deviation. FIG. 8 provides an example method 200 embodiment for log squaring using both directional and non-directional electromagnetic measurements in accordance with aspects of the present disclosure. A brief description of the method 200 is provided here, with a more detailed description of each step provided further below. As shown in FIG. 8, the method 200 begins with the acquisition of directional and non-directional resistivity responses using an electromagnetic logging tool (e.g., tool 50 of FIG. 2) at 202. A smoothing filter is applied to the directional resistivity responses at 204, and a derivative filter is applied to the non-directional resistivity responses at 206. From these filtered responses, peaks are identified as potential bed boundary locations at 208. By combining the peak locations and magnitudes, a bed boundary curve can be derived, as shown at 210. Low pass filtering can be applied to the bed boundary curve at 212, and the filtered peak curve can then be consolidated to define individual bed boundaries at 214. Thin and thick layers can then be removed, as shown at 216. For instance, this may be based on assigned maximum and/or minimum layer thicknesses in the modeling constraints. Beds having a thickness less than a minimum thickness constraint may be deleted from the layered formation model, while those having a thickness greater than a maximum thickness constraint may have additional boundaries inserted. For each resulting layer in the model, Rv and Rh values are assigned at 218.

A more detailed description of the method 200 of FIG. 8 is now provided using the 70 degree well inclination example from FIGS. 6 and 7. The acquisition of directional and non-directional resistivity responses (e.g., at 202) may be acquired by an electromagnetic logging tool in a wellbore traversing a formation. The logging tool may be any suitable electromagnetic logging tool capable of acquiring such responses, such as the tool 50 of FIG. 2. In other embodiments, the tool may include multiple logging tools, such as one tool for obtaining non-directional resistivity responses and another tool (e.g., separate but on the same tool string)

for acquiring directional resistivity responses. The measurements are generally indexed along measurement depth (MD). If apparent formation dip is available, the index can be converted to true stratigraphic thickness (TST), which can provide for easier bed thickness control.

At 204, a smoothing filter is applied to the directional resistivity measurements and, at 206, a derivative filer is applied to the non-directional resistivity measurements. With respect to derivative filtering of the non-directional resistivity measurements, one embodiment may include using a Gaussian derivative filter which, when applied, may help reduce the present of noise as seen in FIG. 6. In one embodiment, the filter window of the Gaussian derivative filter may be defined based on the following basis function:

$$\text{gauss}(1: halflength) = \frac{\frac{1}{halflength} e^{-\frac{coef^2}{2}\left(\frac{i}{halflength}\right)^2}}{\sum_{i=1}^{halflength} \frac{1}{halflength} e^{-\frac{coef^2}{2}\left(\frac{i}{halflength}\right)^2}} \quad (1)$$

Here, the parameter halflength is half of the window length. In one embodiment, the window length may be set to 5 feet as a default, although this may be a configurable parameter. The parameter coef is another factor controlling the filter shape function. In one embodiment, coef may have a value of approximately 2. For a given non-directional resistivity measurement channel curve data(k), the Gaussian derivative may be computed as follows:

$$\text{derivative}(k) = \sum_{i}^{halflength} \text{gauss}(i) \cdot (\text{data}(k+i) - \text{data}(k-i)) \quad (2)$$

With respect to applying a smoothing filter to the directional resistivity measurements, one embodiment may include using a Gaussian smoothing filter, which may reduce noise effects in the directional response curves, as seen in FIG. 7. In one embodiment, the smoothing filter may be based on the same basis function shown in Equation 1. For a given directional resistivity measurement channel curve data(k), the smoothed value may be computed as follows:

$$\text{smooth}(k) = \sum_{i}^{halflength} \text{gauss}(i) \cdot (\text{data}(k+i) - \text{data}(k-i)) \quad (3)$$

After applying smoothing filtering to the directional resistivity responses and derivative filtering to the non-directional resistivity responses, the peaks of the filtered curves are identified as potential bed boundary locations. This is shown FIG. 9, which depicts the potential bed boundaries as selected based on the non-directional resistivity measurements (top graph) and the potential bed boundaries as selected based on the symmetrized directional resistivity measurements (the bottom graph). These potential bed boundary locations are defined according to peaks in the symmetrized directional resistivity responses and peaks in the derivative of the non-directional resistivity responses.

Figure 9:
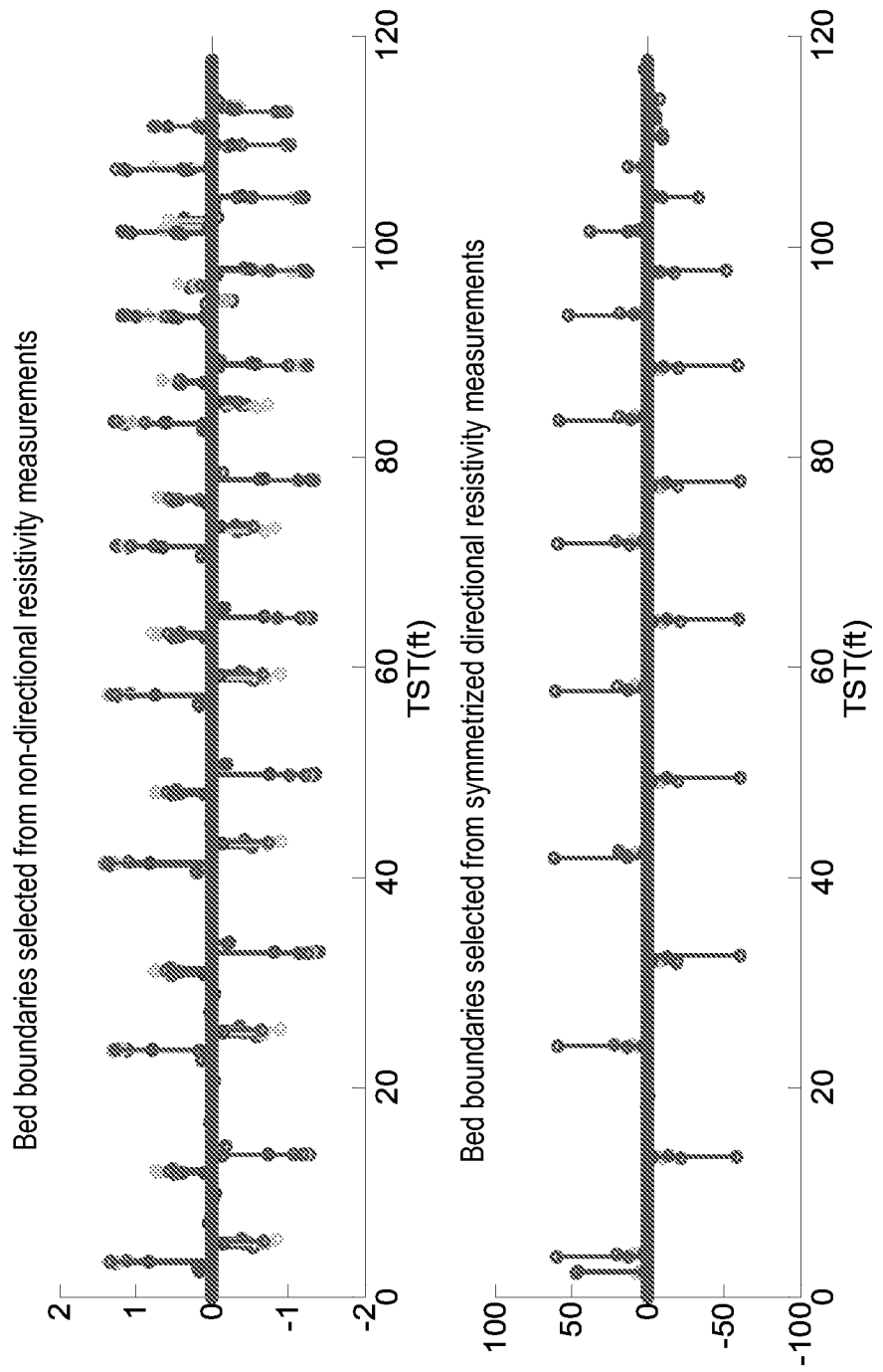
FIG. 9 shows potential bed boundaries corresponding to directional and non-directional measurements in a given formation.
Figure 10:
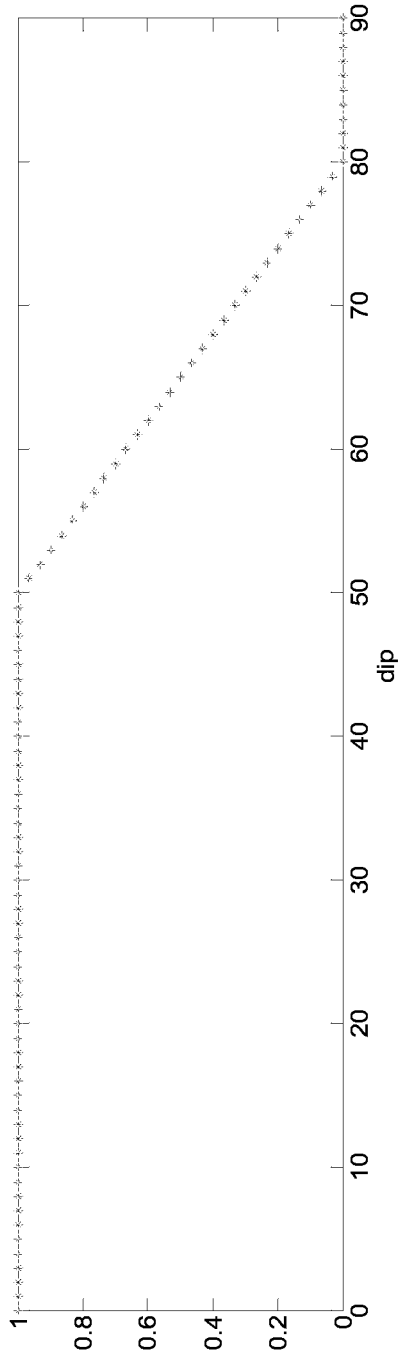
FIG. 10 illustrates an example of a weighting function that can be applied to the potential bed boundaries based on apparent formation dip, in accordance with an embodiment of this disclosure.
Figure 10:
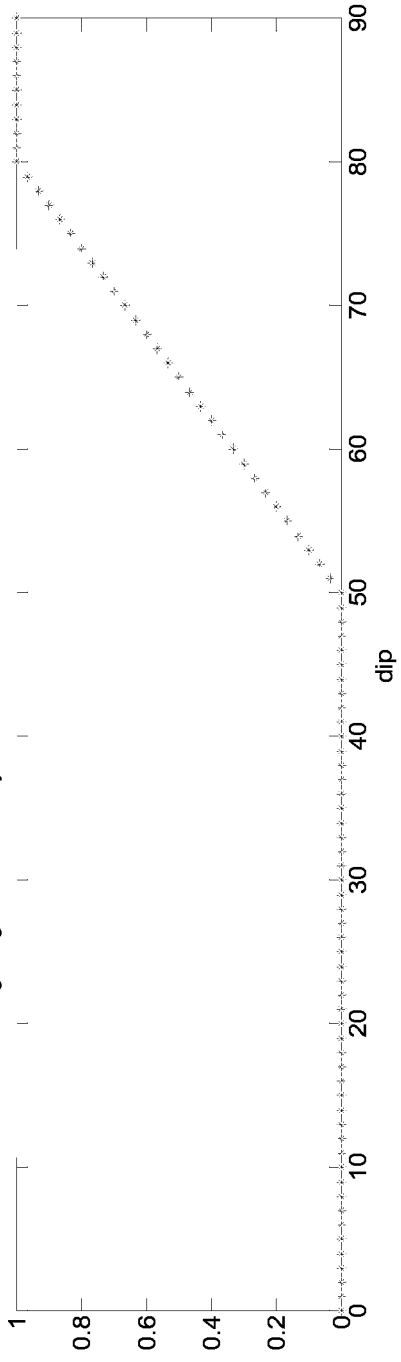

The potential bed boundary peaks and their respective magnitudes from FIG. 9 are then combined using a weighted averaging scheme (e.g., at 210 of method 200). In one embodiment, the weighted averaging is applied as a function of apparent formation dip. An example of such a function is shown in FIG. 10. As can be seen, for non-directional measurements, the weighting function has a value of 1 for low apparent dip and decreases to 0 for horizontal wells. In this embodiment, the weighting function for non-directional measurements remains at 1 up to approximately a 50 degree apparent formation dip. For a dip angle of between approximately 50 to 80 degrees, the weighting gradually reduces to 0, and remains at 0 for dip angles of between approximately 80 to 90 (horizontal well) degrees. The weighting function for directional measurements in this example is the opposite of that for the non-directional measurements. As shown in FIG. 10, the weighting function for directional measurements is 0 up to approximately a 50 degree apparent formation dip. For a dip angle of between approximately 50 to 80 degrees, the weighting gradually increases to 1 and remains at 1 for dip angles of between approximately 80 to 90 degrees. While the transitions between 50 and 80 degrees are approximately linear in this example, it is understood that other weighting functions may not necessarily be linear.

Thus, in this example weighting function, for measurements taken in horizontal wells or near horizontal wells (80-90 degree apparent dip), the non-directional measurements are given no weight and thus boundary locations will be based fully on the directional measurements. The reverse is true in this example for wells having an apparent dip of 0 to 50 degrees. It will be appreciated also that the apparent formation dip may change along the trajectory of the well. Thus, weightings applied to the measurements may change at various depths, provided that apparent formation dip is known across the range of depth. In various embodiments, apparent formation dip may be obtained using any suitable method. In some embodiments, formation dip can be obtained using resistivity imaging, density imaging, or by using existing data. In one embodiment, dip angle can be determined using techniques disclosed in commonly assigned and co-pending U.S. patent application Ser. No. 13/800,271.

It will be appreciated that the example shown in FIG. 10 is merely one possible weighting function. Any other suitable weighting functions may be used, with the understanding that non-directional measurements may be generally weighted more heavily than directional measurements at lower apparent dip angles and generally less heavily than directional measurements at higher dip angles for the reasons discussed above.

Figure 11:
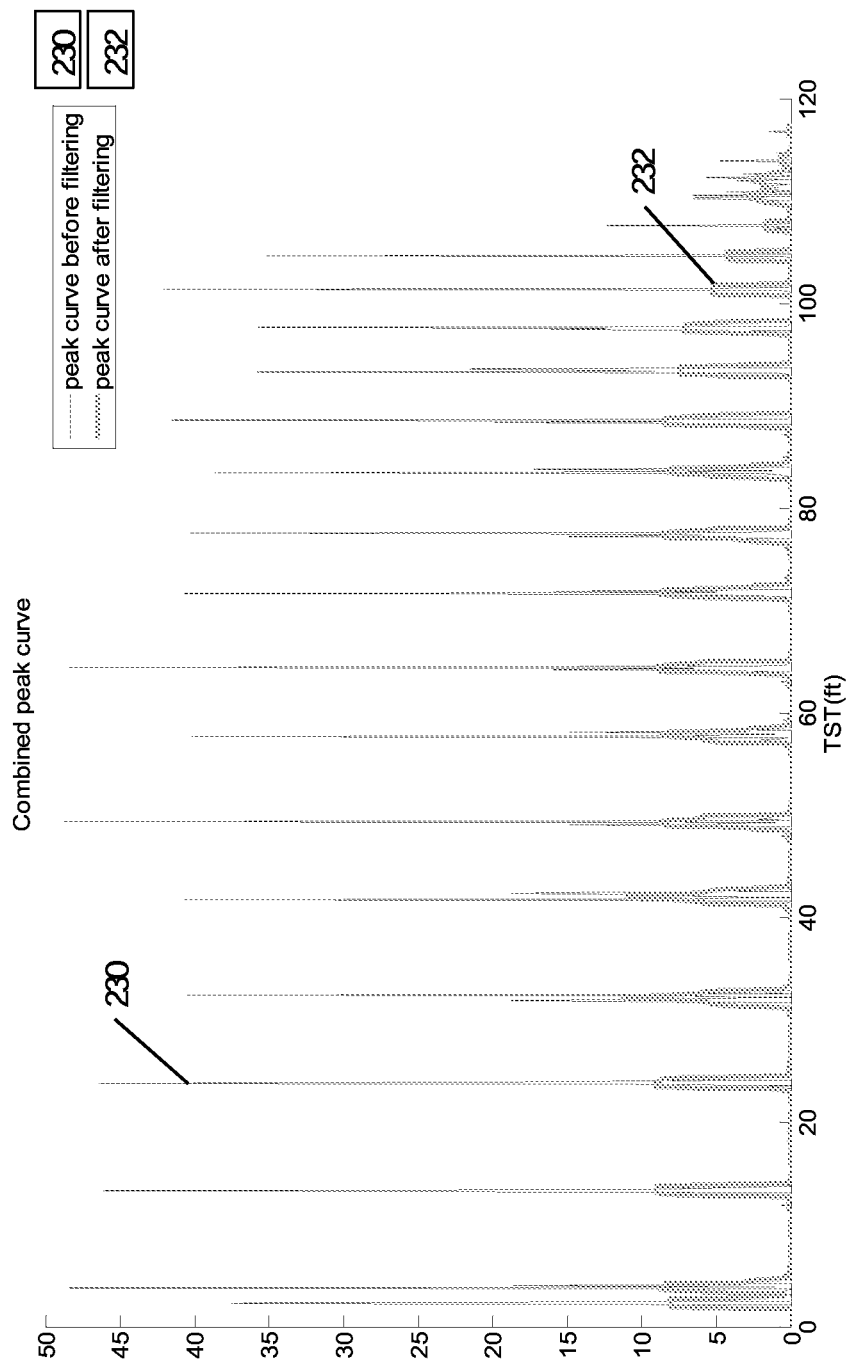
FIG. 11 shows an example consolidated curve of peaks from directional and non-directional resistivity measurement prior to and after applying low pass filtering in accordance with an embodiment of the present disclosure.

By combining the peak curves (and the magnitudes) from the directional and non-directional measurements using the weighting function, a single peak curve 230 for bed boundaries can be obtained, as shown in FIG. 11. Referring to 212 of method 200, low pass filtering can be applied on the combined peak curve to obtain a smoothed curve 232, which helps to ensure stability in the final bed boundary selections. As an example, the low pass filtering in this particular example may use a constant window with a length of 2 feet).

The filtered peak curve 232 may then be consolidated (e.g., 214 of method 200) into individual bed boundaries. This can be performed by defining a cutoff window, wherein for each cluster of peaks within a cutoff window, those peaks are consolidated into a single peak. For instance, the consolidation averaging may include using a mathematical averaging within a cutoff window, such as:

$$\text{TST\_average} = \frac{\left(\begin{array}{c}TST1 \times peak1 + TST2 \times \\ peak2 + \ldots TSTn \times peakn\end{array}\right)}{peak1 + peak2 + \ldots peakn} \quad \text{(Equation 4)}$$

where TST1 and TST2 represent two different bed boundary locations in the cutoff window (up to n locations) and peak1 and peak2 represent their corresponding peak magnitudes post-filtering (e.g., from FIG. 11—up to n corresponding peaks). This results in a single averaged location (TST_average) based on TST1 to TSTn and their respective peak values.

To provide an example with reference to FIG. 11, assuming a cutoff window exists from TST values of 0 to 10 feet, it can be seen that two potential bed boundaries exist in this window at approximately TST=2 (peak of approximately 8) and TST=4 (peak of approximately 9). Using the example averaging equation above (Equation 4), the TST_average in this cutoff window is approximately TST_average=3.05. To provide another example that assumes a larger cutoff window, such as a 20 feet window from TST=40 to TST=60, we see potential bed boundaries at approximately TST=42 (peak of approximately 12), TST=49 (peak of approximately 8) and TST=57 (peak of approximately 8). Using the averaging technique of Equation 4, this results in a TST_average bed boundary location being selected at approximately TST=48.2 feet. Again, these are just some examples using the data in FIG. 11. It is understood that the selection of bed boundaries is done by weighting the potential boundaries within a selected cutoff window based on their corresponding peak magnitudes (e.g., after low pass filtering is applied).

Further, if the purpose of the log squaring is to provide an initial model for an inversion, then maximum and minimum layer thickness constraints may also be enforced. For instance, thin beds below a minimum layer thickness may be removed or moved and thick beds that exceed a maximum layer thickness may be removed via the insertion of additional boundaries within that bed.

Figure 12:
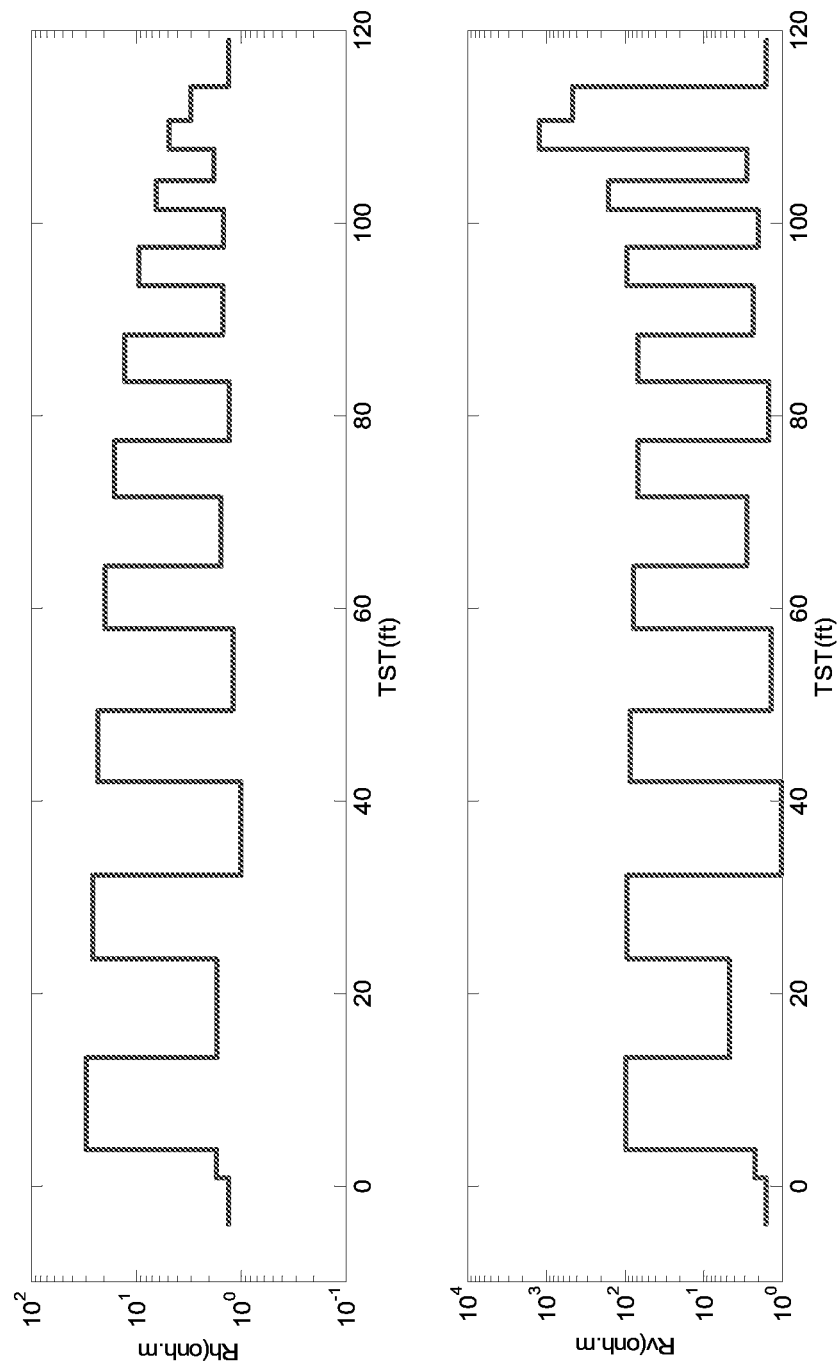
FIG. 12 shows example log squaring results as obtained from the curves from FIG. 11.

Once the bed boundaries are defined, horizontal and vertical resistivities may be assigned to each layer, i.e., based on resistivity measurements taken from the center of that layer. To avoid spikes or noise-related distortions in the data, one embodiment may include taking an average of multiple data points in the center of the bed/layer. FIG. 12 shows a final set of log squaring results based on the example described with respect to FIGS. 8-11.

As will be understood, the various techniques described above and relating to log squaring using both directional and non-directional measurements are provided as example embodiments. Accordingly, it should be understood that the present disclosure should not be construed as being limited to only the examples provided above. Further, it should be appreciated that the log squaring techniques disclosed herein may be implemented in any suitable manner, including hardware (suitably configured circuitry), software (e.g., via a computer program including executable code stored on one or more tangible computer readable medium), or via using a combination of both hardware and software elements. Further, it is understood that the various log squaring techniques described may be implemented on a downhole processor (e.g., a processor that is part of an electromagnetic logging tool, such as tool 50 of FIG. 2), such that the processing is performed downhole, with the results sent to the surface by any suitable telemetry technique. Additionally, in other embodiments, directional and non-directional electromagnetic measurements may be transmitted uphole via telemetry, and the log squaring process for defining an initial model for inversion of formation parameters (e.g., Rh, Rv, dip, etc.) may be performed uphole on a surface computer (e.g., one that is part of control system 152 in FIG. 1).

While the specific embodiments described above have been shown by way of example, it will be appreciated that many modifications and other embodiments will come to the mind of one skilled in the art having the benefit of the teachings presented in the foregoing description and the associated drawings. Accordingly, it is understood that various modifications and embodiments are intended to be included within the scope of the appended claims.

What is claimed is:

1. An electromagnetic logging while drilling method comprising:
   rotating an electromagnetic logging tool in a wellbore formed through a subsurface formation to acquire directional and non-directional resistivity measurements in the wellbore;
   applying filtering to the directional and non-directional resistivity measurements;
   identify peaks in the directional and non-directional resistivity measurement curves as potential bed boundary locations;
   constructing a bed boundary curve by combining the identified peaks and their corresponding magnitudes using a weighting function based at least partially upon the apparent formation dip;
   consolidating the peaks on the bed boundary curve to define individual bed boundaries; and
   assigning resistivity values to each layer, as defined by the individual bed boundaries.

2. The method of claim 1, wherein the electromagnetic logging tool comprises at least one axial transmitter antenna and at least one axial receiver antenna for acquiring the non-directional resistivity measurements.

3. The method of claim 2, wherein the electromagnetic logging tool comprises a plurality of axial transmitter antennas to provide for different transmitter-receiver spacings with the at least one axial receiver antenna.

4. The method of claim 2, wherein the electromagnetic logging tool comprises a plurality of axial receiver antennas to provide for different transmitter-receiver spacings with the at least one axial transmitter antenna.

5. The method of claim 1, wherein the electromagnetic logging tool comprises at least one tilted or transverse receiver antenna that acquires the directional resistivity measurements by receiving an electromagnetic signal transmitted from at least one axial, tilted, or transverse transmitter antenna.

6. The method of claim 1, wherein the electromagnetic logging tool comprises at least one tilted or transverse transmitter antenna that transmits an electromagnetic signal received by at least one axial, tilted or transverse receiver antenna that acquires the directional resistivity measurements.

7. The method of claim 1, wherein applying filtering to the directional resistivity measurements comprises applying a smoothing filter.

8. The method of claim 7, wherein the smoothing filter comprises a Gaussian smoothing filter.

9. The method of claim 1, wherein applying filtering to the non-directional resistivity measurements comprises applying a derivative filter.

10. The method of claim 9, wherein the derivative filter comprises a Gaussian derivative filter.

11. The method of claim 1, wherein the weighting function applies a greater weighting factor to peaks from the non-directional resistivity measurements than to peaks from the directional resistivity measurements when the apparent formation dip indicates a well inclination is closer to vertical, and applies a greater weighting factor to peaks from the directional resistivity measurements that to peaks from the non-directional resistivity measurements when the apparent formation dip indicates a well inclination is closer to horizontal.

12. The method of claim 1, wherein the weight function comprises:
applying a weighting factor of approximately 1 to peaks from the non-directional resistivity measurements and applying a weighting factor of approximately 0 to peaks from the directional resistivity measurements when the apparent formation dip is between approximately 0 to 50 degrees;
applying a weighting factor to peaks from the non-directional resistivity measurements that gradually decreases from approximately 1 to 0 and applying a weighting factor to peaks from the directional resistivity measurements that gradually increases from approximately 0 to 1 as the apparent formation dip increases from approximately 50 to 80 degrees; and
applying a weighting factor of approximately 0 to peaks from the non-directional resistivity measurements and applying a weighting factor of approximately 1 to peaks from the directional resistivity measurements when the apparent formation dip is between approximately 80 to 90 degrees.

13. The method of claim 1, wherein the bed boundary curve is filtered before consolidating the peaks.

14. The method of claim 1, wherein consolidating the peaks comprises:
for a given cutoff window, identifying the number of potential bed boundaries in the bed boundary curve within the cutoff window; and
averaging the bed boundary locations based on their peak magnitudes.

15. The method of claim 1, wherein when the thickness of a layer defined by the individual bed boundaries is less than a minimum thickness, at least one bed boundary defining that layer is removed.

16. The method of claim 1, wherein when the thickness of a layer defined by the individual bed boundaries is greater than a maximum thickness, an additional bed boundary is added.

17. The method of claim 1, wherein assigning resistivity values to each layer comprises assigning a horizontal resistivity and a vertical resistivity.

18. The method of claim 1, further comprising controlling the drilling of the wellbore based at least in part on the resistivity values assigned to each layer.

19. An electromagnetic logging while drilling system comprising:
an electromagnetic logging tool that, when deployed in a wellbore formed through a subsurface formation, rotates and acquires directional and non-directional resistivity measurements;
a processing device configured to:
filter to the directional and non-directional resistivity measurements;
identify peaks in the directional and non-directional resistivity measurement curves as potential bed boundary locations;
construct a bed boundary curve by combining the identified peaks and their corresponding magnitudes using a weighting function based at least partially upon the apparent formation dip;
consolidate the peaks on the bed boundary curve to define individual bed boundaries; and
assign resistivity values to each layer, as defined by the individual bed boundaries.

20. The system of claim 19, wherein the processing device constructs a layered earth model based on the layers.

21. The system of claim 19, wherein the electromagnetic logging tool comprises at least one axial transmitter antenna and at least one axial receiver antenna for acquiring the non-directional resistivity measurements.

22. The method of claim 19, wherein the processing device is further configured to control the drilling of the wellbore based at least in part on the resistivity values assigned to each layer.

* * * * *